(12) United States Patent
Raschella et al.

(10) Patent No.: US 8,104,186 B2
(45) Date of Patent: Jan. 31, 2012

(54) METHOD AND SYSTEM FOR PROJECTING AN AIMING X-SHAPED MARK ON A TARGET

(76) Inventors: Michael Raschella, Montreal (CA); Marin Tanase, Montreal (CA)

( * ) Notice: Subject to any disclaimer, the term of this patent is extended or adjusted under 35 U.S.C. 154(b) by 262 days.

(21) Appl. No.: 12/457,081

(22) Filed: Jun. 1, 2009

(65) Prior Publication Data

US 2009/0241357 A1 Oct. 1, 2009

Related U.S. Application Data

(63) Continuation-in-part of application No. 11/797,667, filed on May 7, 2007, now abandoned.

(51) Int. Cl.
 *F41G 1/34* (2006.01)
 *F41G 1/467* (2006.01)
 *G01C 15/00* (2006.01)

(52) U.S. Cl. .............................. 33/286; 33/265; 42/114

(58) Field of Classification Search .................. 33/286, 33/265, DIG. 21, 263, 276, 277, 281; 42/114
See application file for complete search history.

(56) References Cited

U.S. PATENT DOCUMENTS

| | | | |
|---|---|---|---|
| 3,117,480 A | 1/1964 | Peddinghaus | ............... 33/286 |
| 3,130,633 A | 4/1964 | Rantsch | ............... 33/286 |
| 4,097,155 A | 6/1978 | Appert | |
| 4,111,383 A | 9/1978 | Allen et al. | |
| 4,381,150 A | 4/1983 | Curtis | |
| 5,118,186 A | 6/1992 | Schrätzenstaller et al. | |
| 5,243,398 A * | 9/1993 | Nielsen | ............... 356/138 |
| 5,392,550 A * | 2/1995 | Moore et al. | ............... 42/117 |
| 5,539,990 A | 7/1996 | Le | ............... 33/286 |
| 5,758,448 A * | 6/1998 | Thummel | ............... 42/114 |
| 5,864,956 A | 2/1999 | Dong | ............... 33/286 |
| 5,920,995 A | 7/1999 | Sammut | |
| 6,230,431 B1 * | 5/2001 | Bear | ............... 42/117 |
| 6,408,731 B1 * | 6/2002 | Elsener | ............... 86/50 |
| 6,499,247 B1 * | 12/2002 | Peterson | ............... 42/116 |
| 6,694,629 B2 | 2/2004 | Goodrich | ............... 33/286 |
| 6,802,262 B1 * | 10/2004 | Warnagiris et al. | ........... 102/502 |
| 6,941,665 B1 | 9/2005 | Budrow et al. | ............... 33/286 |
| 7,134,375 B2 | 11/2006 | Fish, Jr. | |
| 7,146,739 B2 | 12/2006 | Ku et al. | ............... 33/286 |
| 7,204,027 B2 | 4/2007 | Tacklind | ............... 33/286 |
| 7,240,437 B1 | 7/2007 | Moldovan | ............... 33/286 |
| 7,506,468 B2 * | 3/2009 | Farrell et al. | ............... 42/70.06 |
| 2001/0032405 A1 * | 10/2001 | Kaminski | ............... 42/70.05 |
| 2003/0180692 A1 | 9/2003 | Skala et al. | |
| 2004/0093749 A1 | 5/2004 | Wu | ............... 33/286 |
| 2005/0278964 A1 | 12/2005 | Minica et al. | |
| 2007/0044365 A1 * | 3/2007 | Deken | ............... 42/146 |
| 2007/0056174 A1 | 3/2007 | Bascom et al. | ............... 33/286 |
| 2007/0271800 A1 | 11/2007 | Hersey et al. | ............... 33/286 |

* cited by examiner

*Primary Examiner* — Christopher Fulton
(74) *Attorney, Agent, or Firm* — Mario Theriault

(57) ABSTRACT

The laser aiming system for projecting a X-shaped aiming beam along an aiming axis, has a first and second laser modules which are adapted to project a first and second planar fanned beams along a first and second axes of projection respectively. The first and second axes of projection extend parallel with, and spaced-apart from each other and from the aiming axis. The first and second planar fanned beams are skewed about the first and second axes of projection respectively, intersecting each other on the aiming axis and forming a X-shaped aiming beam having different supplementary angles.

16 Claims, 3 Drawing Sheets

METHOD AND SYSTEM FOR PROJECTING AN AIMING X-SHAPED MARK ON A TARGET

This is a continuation-in-part application of application Ser. No. 11/797,667, filed May 7, 2007, now abandoned.

FIELD OF THE INVENTION

This invention pertains to projections of laser aiming beams, and more particularly it pertains to the projection of a X-shaped aiming laser beam toward a target.

BACKGROUND OF THE INVENTION

In order to characterize the present invention over the prior art, reference is made to systems found in the prior art for projecting a laser beam toward a target. Three examples are briefly described below.

U.S. Pat. No. 5,118,186 issued to J. Schrätzenstaller et al. on Jun. 2, 1992. This document discloses a sighting system for weapons wherein a single spot is projected toward a target.

US Patent Application 2003/0180692 filed by J. A. Skala et al. on Mar. 22, 2002. This document discloses an aim point tracking system, wherein the aiming mark projected is a crosshair made of two laser lines, extending horizontally and vertically respectively.

US Patent Application 2005/0278964 filed by S. Minica et al. on Jun. 17, 2004. This document discloses a laser targeting system mounted on an arrow point and projecting on a target, a dot where the arrow will hit once released.

Although the aiming systems of the prior art deserve undeniable merits, there is a need for an aiming system capable of projecting aiming beams generating a X-shaped mark on a target as opposed to a spot or a crosshair.

A spot mark is difficult to maintain in position on a colourful target, on a moving target, on a target partly hidden by camouflage material or on an object having numerous visual details thereon. Similarly, a crosshair is sometime difficult to adjust and to see on an object having a rounded shape such as a cylinder or a sphere or on an object having horizontal or vertical features, such as a building, a briefcase or other boxlike package.

It is believed that a need exists for an laser-projected aiming mark having the shape of a X. Even if such a X-shaped mark is only partly seen on a target, one can easily determine where the center of the mark is located, which make is much easier to adjust the mark to the target.

In the present context, a X-shaped mark is made of two lines intersecting each other and making different supplementary angles there between the lines. Preferably, neither line is perfectly horizontal or perfectly vertical.

In another aspect of aiming devices, the laser aiming systems of the prior art are aligned to an expected hit spot of a shot fired from a known distance. If that distance changes, the laser mark is no longer reliable. Therefore, there is a need for a laser aiming system that is relatively true regardless of the distance between the shooter and the target.

SUMMARY OF THE INVENTION

In the present invention, however, there is provided a method and a system for projecting a X-shaped aiming mark on a target. The X-shaped mark is made of two lines which intersect each other with different supplementary angles. Each line is the projection of a planar fanned laser beam.

More particularly, in a first aspect of the present invention, there is provided a laser aiming system for projecting a X-shaped aiming beam along an aiming axis. The laser aiming system has a first and second laser modules which are adapted to project a first and second planar fanned beams along a first and second axes of projection respectively. The first and second axes of projection extend parallel with, and spaced-apart from each other and from the aiming axis. The first and second planar fanned beams are skewed about the first and second axes of projection respectively, intersecting each other on the aiming axis and forming a X-shaped aiming beam having different supplementary angles.

The laser aiming system is applicable to firearms, to disrupters used to destroy suspicious packages, to weapons of war, to toys such as laser tag guns, paint-ball guns and to other projectile launchers. The aiming system is easy to calibrate and is true over great distances.

In another aspect of the present invention, there is provided a method for calibrating a laser aiming system to an aiming axis, wherein the laser aiming system has two collimated laser modules projecting a first and second planar fanned beams, for generating a X-shaped aiming beam. This method comprises the steps of aligning axes of projection of the laser modules parallel with each other and with the aiming axis; and skewing the planar fanned beams about their respective axes of projection, and forming an intersection of the planar fanned beams on the aiming axis, wherein the intersection is made of lines intersecting at different angles.

In yet a further aspect of the method mentioned above, an additional step is provided when each of the fanned beams has an inherent drift therein. This additional step is described as orienting the drifts below the aiming axis. The X-shaped aiming mark is then projected slightly below the aiming axis of the barrel on which the laser aiming system is mounted. The aiming mark is projected below the aiming axis for accounting for a natural drop in the trajectory of the projectile to be launched, and for providing a truer projection of the aiming mark.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

The drawings illustrate a preferred embodiment of a laser system for generating a X-shaped laser projection toward a target.

DESCRIPTION OF THE PREFERRED EMBODIMENT

Figure 1:
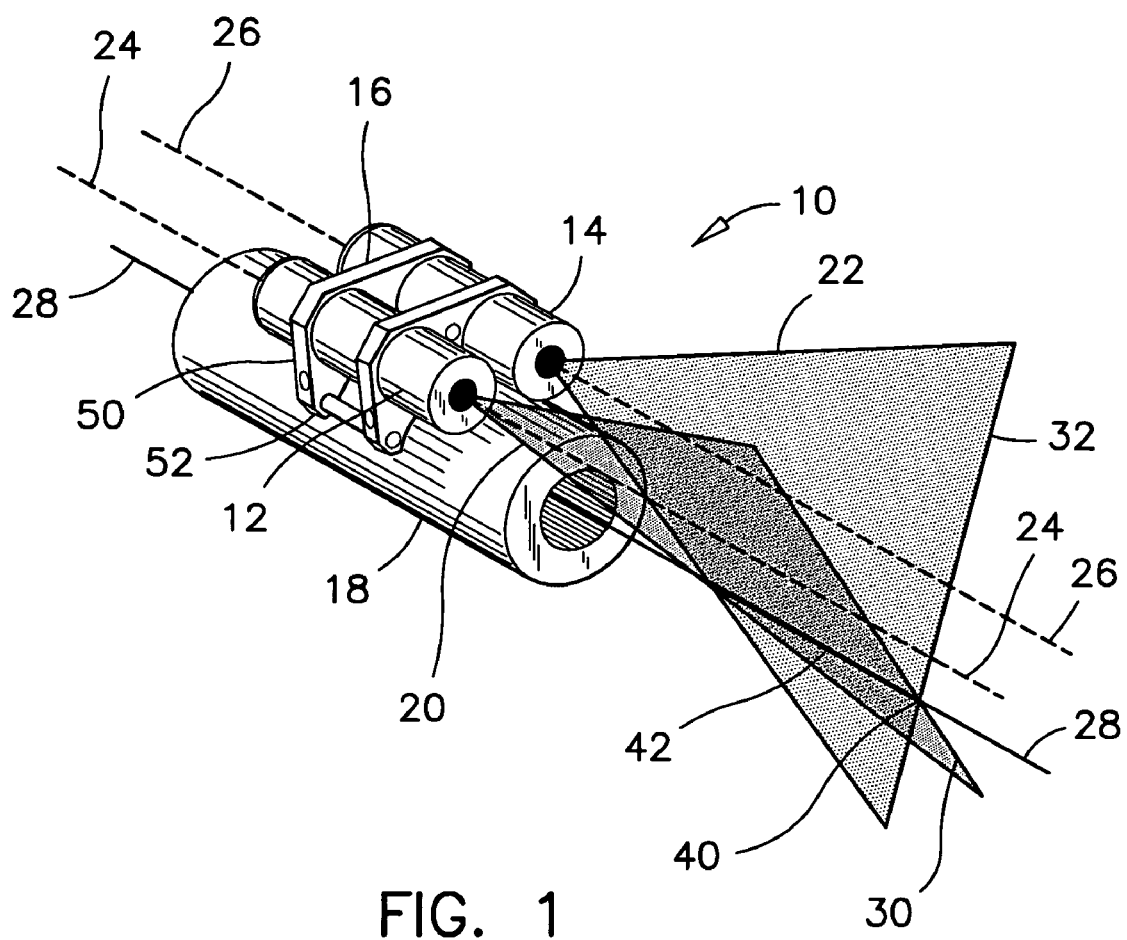
FIG. 1 illustrates a system for projecting a X-shaped mark on a target.

While this invention is susceptible of embodiment in many different forms, there is shown in the drawings and will be described in details herein one specific embodiment of the present invention, with the understanding that the present disclosure is to be considered as an example of the principles of the invention and is not intended to limit the invention to the embodiment illustrated and described.

The system 10 according to the preferred embodiment for projecting an aiming X-shaped mark on a target is illustrated in FIG. 1. The system comprises two laser modules 12, 14 mounted on a saddle-like holder 16. The saddle-like holder 16 is mounted astride on the barrel 18 of a disrupter unit, for example. Although a barrel of a disrupter unit is mentioned herein, the aiming system 10 can also be mounted to the telescope mount or other sight rail mount of a firearm, on a weapon of war, or on a toy gun.

Both laser modules 12, 14 have collimated light beams projecting planar fanned beams 20, 22 respectively. Both laser modules 12, 14 have axes of projection 24, 26 respectively that are set parallel with each other and parallel with the central axis 28 of the barrel 18 on which they are mounted. Both laser modules 12, 14 project lines 30, 32 respectively, which extend perpendicular to their respective axes of projection 24, 26.

A preferred method for aligning the fanned beams 20, 22 to the barrel axis 28 consists of skewing the laser modules 12, 14 and the fanned beams 20, 22 so that the fanned beams 20, 22 intersect each other and the barrel axis 28 along a common line segment 42 passing through intersection point 40. The X-shaped projection generated by the system carries as far as the power of the laser modules allows it to, and the center 40 thereof remains remarkably true to the axis 28 of the barrel 18 over great distances between the barrel 18 and the target on which the barrel is aimed.

The alignment of the fanned beams 20, 22 is made by inserting a laser module (not shown) inside the bore of the barrel 18 for example and by skewing the fanned beams 20, 22 until they intersect the line generated by the laser-line generator along the axis 28 of the barrel.

The barrel axis 28 is also referred to herein as the aiming axis 28, for convenience.

The saddle-like holder 16 is made of spaced apart plates 50 having holes therein to receive both laser modules there through with their axes of projection 24, 26 extending in a parallel alignment with each other. The saddle-like holder 16 has stand members 52 capable of holding both laser modules 12, 14 to the barrel 18 with the axes of projection 24, 26 of the laser modules extending in a parallel alignment with the axis 28 of the barrel 18.

Once calibrated, the laser module assembly can be taken off the barrel 18 and reinstalled as required without calibration. The laser module assembly, 12, 14, 16 is preferably detachably mounted to the barrel 18 with a strap, a clamp or other fasteners selected by the designer.

Figure 2:
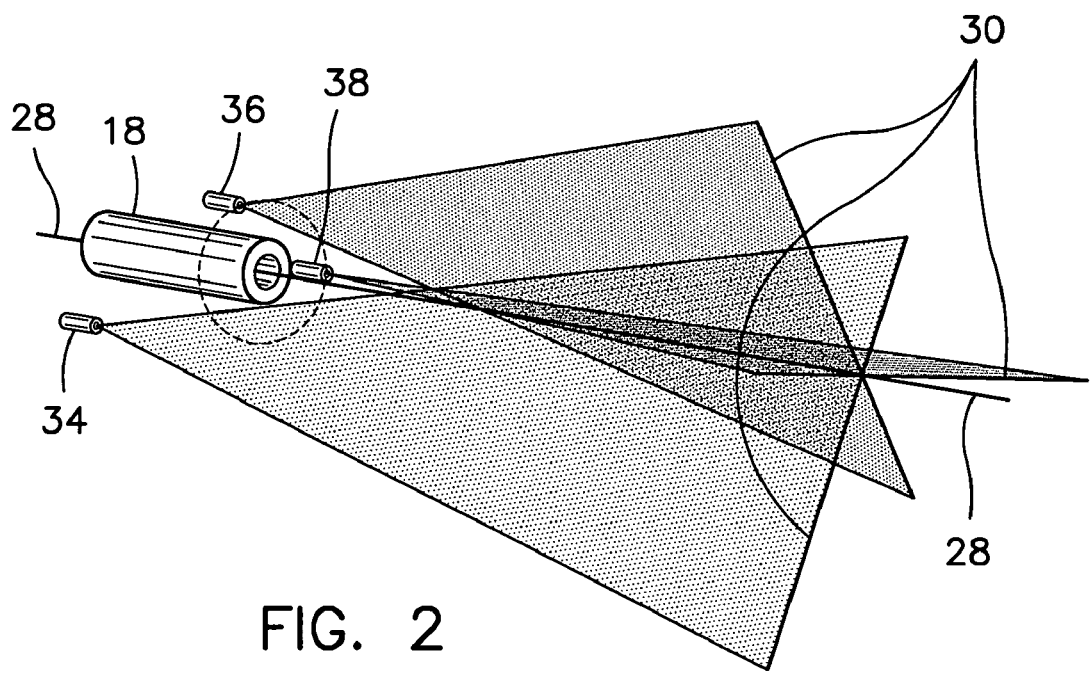
FIG. 2 illustrates a system for generating a three-arm projection on a target.
Figure 3:
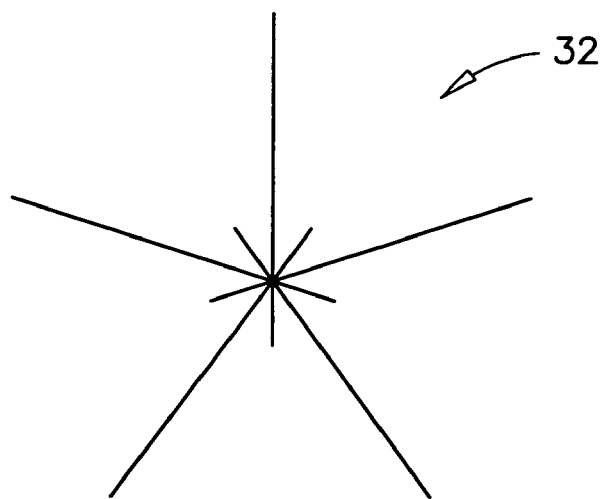
FIG. 3 illustrates a five-arm mark which can be generated in a similar manner as the mark illustrated in FIG. 2.

Although only two laser modules 12, 14 have been explained herein above, it will be understood that three or more laser modules can be installed on or near a barrel in a same way as described herein to generate an aiming mark in the shape of a multi-arm projection or mark such as the three-arm projection 30 shown in FIG. 2, and the five-arm mark 32 shown in FIG. 3, for examples. At least one X-shaped mark can be found in each of these alternative aiming projection 30 and mark 32 and therefore, they should be considered as having been generated using the method according to the present invention.

Also, it will be appreciated that a single laser module can be used to generate two fanned beams from a same light source.

Referring back to FIG. 2, it will be appreciated that the three laser modules 34, 36, and 38 do not have to be a same radial distance from the aiming axis 28, and they do not have to be at a same position along the aiming axis 28. When the axes of projection of the laser modules 34, 36, and 38 are parallel with the aiming axis 28, the method described herein is only limited by the power and collimating accuracy of the laser modules.

Although the fanned beams illustrated herein are symmetrical to the axes of projection of the respective laser modules, different collimators can also be used to limit the width of the beams to obtain a X-shaped mark that has symmetrical proportions relative to the aiming axis 28. The planar fanned laser beams can also be collimated to generate a X-shaped mark that is made of dashed lines, lines of dots, lines of X's, crosses or O's or lines made with other graphic symbols.

Figure 4:
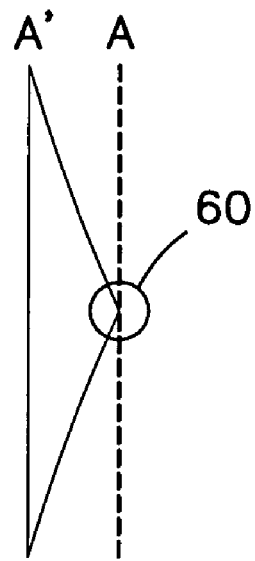
FIG. 4 illustrates an inherent drift of a projected line in a planar fanned laser beam.

The above description has been written for high quality laser modules, the beams of which do not deviate from their projected paths. In reality, however, a designer cannot always find high quality lasers, and must be contented with laser beams that have a slight inherent drift in their projections. In that perspective, there is illustrated in FIGS. 2-4, a method to calibrate two fanned beams each having an inherent drift of their projected lines. The method presented herein take advantage of an inherent drift in a laser beam to enhance the precision of the preferred aiming system.

Figure 5:
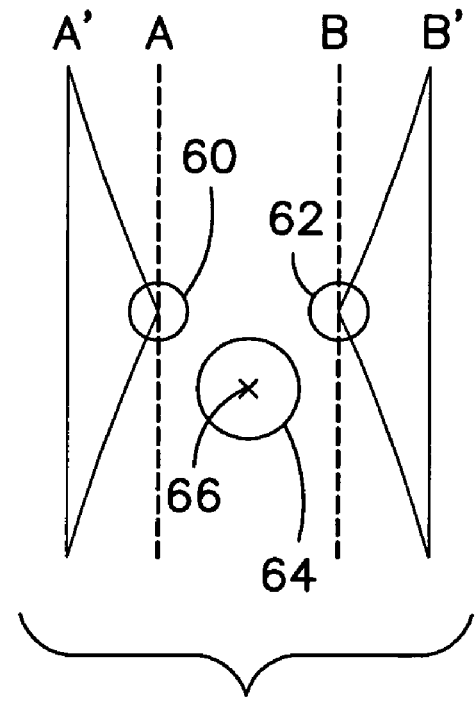
FIG. 5 illustrates a preferred positioning of two planar fanned beams each having an inherent drift of their projected lines.

FIG. 4 illustrates a planar laser beam A emitted from an average quality laser module 60 and seen when looking toward its source. Over a large distance, this beam drifts to one side and the projected line 'A' is no longer true to the axis of projection of the laser module 60. When both laser beams A and B in the preferred aiming system have such a drift, the laser modules 60, 62, as illustrated in FIG. 5, are placed over a barrel 64 at a same distance above the barrel, and are set such that the direction of the drift is facing away from the axis 66 of the barrel 64.

Figure 6:
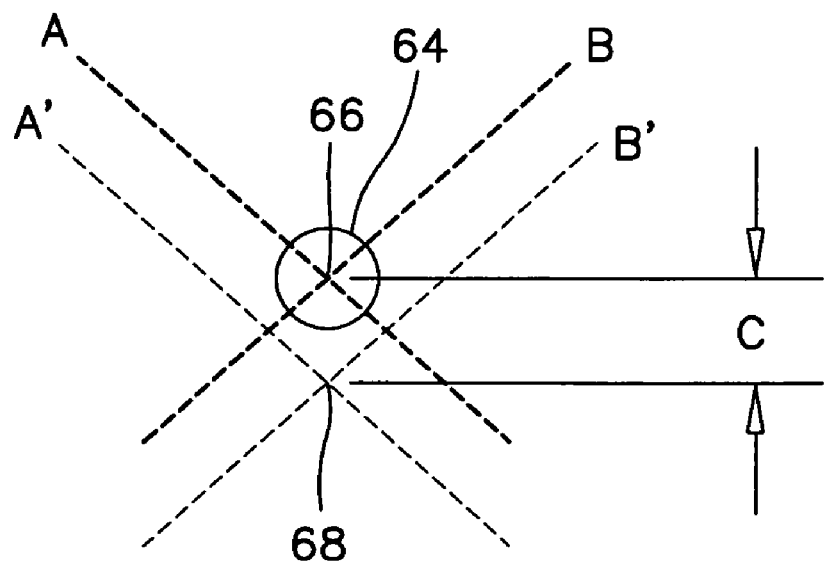
FIG. 6 illustrates an emitted and a projected X-shaped mark made by two planar fanned beams having inherent drift in their projected lines.

The laser beams A and B are adjusted as described earlier, to intersect each other and on the axis 66 of the barrel 64 on which the laser modules 60, 62 are mounted, as shown in FIG. 6. As a result, the X-shaped projection A, B leaves the barrel in a true alignment with the axis of the barrel 66, and drift down toward the target to a new position 68 which is slightly lower than the axis 66 of the barrel 64. The amount C of drift of the X-shaped projection A',B' corresponds to some extent to an inherent drop of a projectile over its course. Therefore, it will be appreciated that the X-shaped projection A', B' on a target is more realistic and more precise than one with no drift at all.

If one desires to obtain an aiming mark that takes into account the inherent drop in the trajectory of a projectile, a laser beam drift may be set in the laser modules to obtain the above-mentioned advantageous effect to a desired degree.

While one preferred embodiment of the present invention and a preferred method have been illustrated and described herein above, it will be appreciated by those skilled in the art that various modifications, alternate constructions and equivalents may be employed. Therefore, the above description and the illustrations should not be construed as limiting the scope of the invention which is defined by the appended claims.

What is claimed is:

1. A laser aiming system for projecting a X-shaped aiming beam along an aiming axis comprising;
    a first and second laser modules mounted in a fixed relationship with said aiming axis and being adapted to project a first and second planar fanned beams along a first and second axes of projection respectively;
    said first and second axes of projection extending parallel with and spaced-apart from each other and from said aiming axis; said first and second axes of projection extending* a same distance from said aiming axis;

said first and second planar fanned beams being skewed about said first and second axes of projection respectively, intersecting each other on a segment of said aiming axis and forming with said segment, a X-shaped aiming beam having different supplementary angles; and each of said planar fanned beams has a drift therein and said drifts being set below said aiming axis.

2. The laser aiming system as claimed in claim 1 further comprising a projectile launcher having a barrel and said aiming axis is a central axis of said barrel.

3. The laser aiming system as claimed in claim 2, wherein said first and second laser modules are mounted to said barrel.

4. The laser aiming system as claimed in claim 3, wherein said first and second laser modules are detachably mounted to said barrel.

5. The laser aiming system as claimed in claim 4, further comprising a holder supporting said laser modules to said barrel.

6. The laser aiming system as claimed in claim 1 wherein said aiming axis is a central axis of a barrel of a disrupter.

7. The laser aiming system as claimed in claim 1 wherein said aiming axis is a central axis of a barrel of a firearm.

8. The laser aiming system as claimed in claim 1, wherein said aiming axis is a laser beam of a laser toy gun.

9. The laser aiming system as claimed in claim 1, wherein said X-shaped beam has symmetrical proportions relative to said aiming axis.

10. A laser aiming system for projecting a X-shaped aiming beam along an aiming axis of a projectile launcher, wherein said projectile launcher has a barrel and said aiming axis is a central axis of said barrel, comprising;

a first and second laser modules being adapted to project a first and second planar fanned beams along a first and second axes of projection respectively; and wherein each of said planar fanned beams has a drift therein; said first and second axes of projection extending parallel with and spaced-apart from each other and at a same distance from said aiming axis; said first and second planar fanned beams being skewed about said first and second axes of projection respectively, intersecting each other on said aiming axis and forming a X-shaped aiming beam having different supplementary angle, with said drifts being set below said aiming axis.

11. The laser aiming system as claimed in claim 10 wherein said X-shaped projection is made of dashed lines.

12. The laser aiming system as claimed in claim 10, wherein said X-shaped beam has symmetrical proportion relative to said aiming axis.

13. The laser aiming system as claimed in claim 10 wherein said projectile launcher is part of group of projectile launchers including disrupters, firearms, toy guns and weapons of war.

14. The laser aiming system as claimed in claim 10, further comprising a holder detachably supporting said laser modules to said barrel.

15. A method for calibrating a laser aiming system to an aiming axis, wherein said laser aiming system has two collimated laser modules projecting a first and second planar fanned beams respectively wherein each of said planar fanned beams has a drift therein, for projecting a X-shaped aiming beam toward a target, comprising the steps of;

setting said laser modules above said aiming axis at a same distance from said aiming axis, aligning axes of projection of said laser modules parallel with each other and with said aiming axis;

skewing said planar fanned beams about said axes of projection respectively, and forming an intersection of said planar fanned beams on said aiming axis, wherein said intersection is made of lines intersecting at different angles, and;

setting said drifts below said aiming axis.

16. The method as claimed in claim 15, further comprising the step of collimating said planar fanned beams and generating a symmetry in said X-shaped aiming beam relative to said aiming axis.

* * * * *